Dec. 6, 1955     A. BASSOFF     2,725,871
TRIMMER
Filed Nov. 17, 1952     2 Sheets-Sheet 1
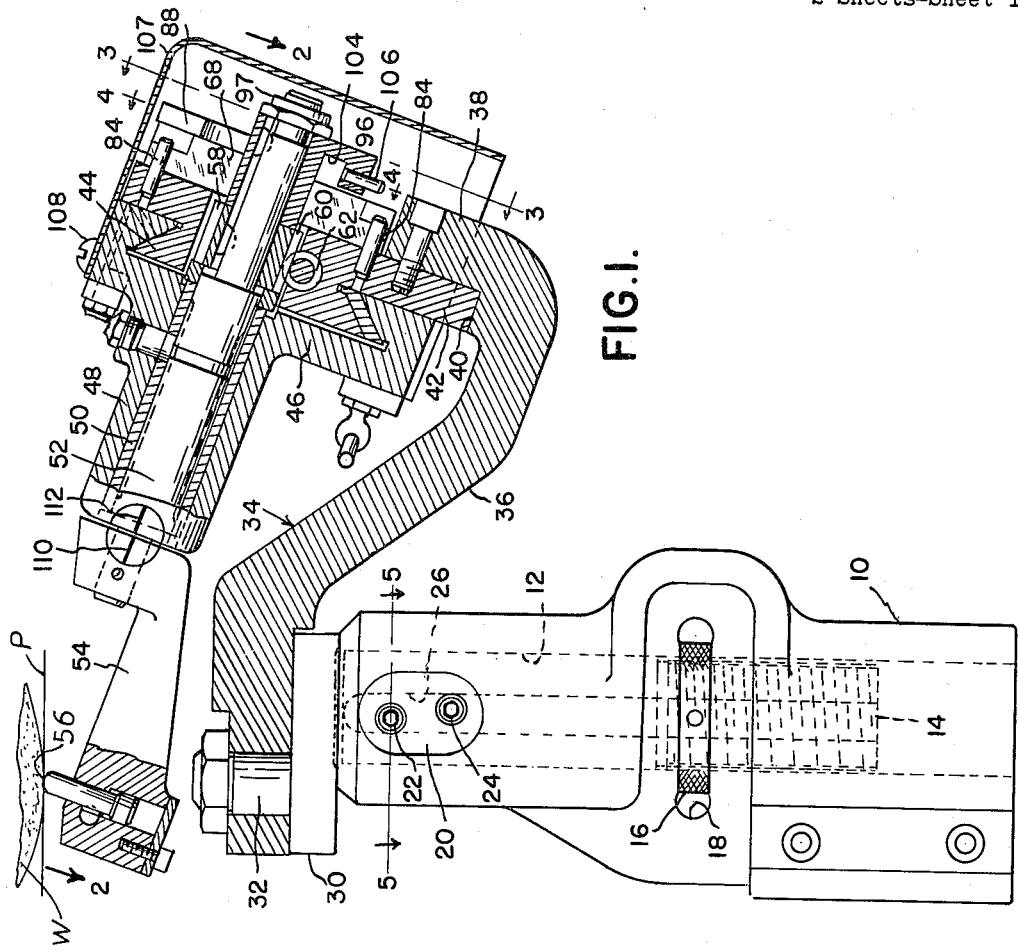
INVENTOR.
ARTHUR BASSOFF
BY Whittemore,
Hulbert & Belknap
ATTORNEYS Dec. 6, 1955 A. BASSOFF 2,725,871
TRIMMER
Filed Nov. 17, 1952 2 Sheets-Sheet 2
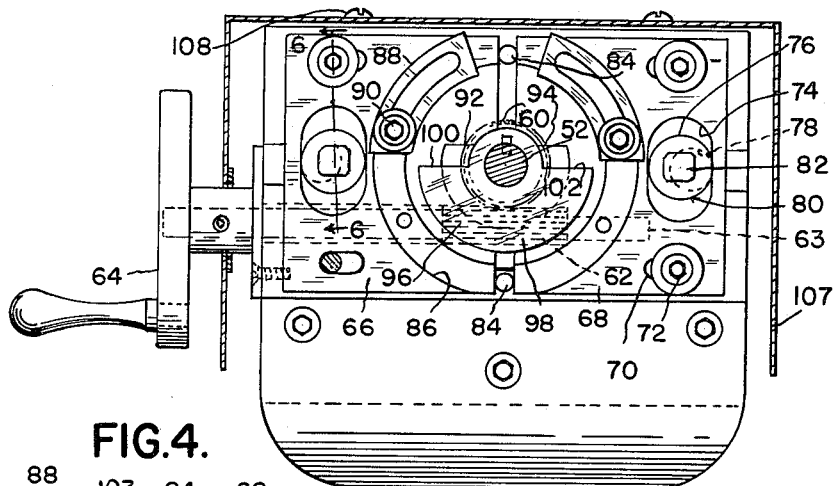
INVENTOR.
ARTHUR BASSOFF
BY Whittemore,
Hulbert & Belknap
ATTORNEYS

United States Patent Office 2,725,871
Patented Dec. 6, 1955

2,725,871
TRIMMER

Arthur Bassoff, Detroit, Mich., assignor to National Broach & Machine Company, Detroit, Mich., a corporation of Michigan Application November 17, 1952, Serial No. 321,012

14 Claims. (Cl. 125—11)

The present invention relates to a trimmer and more particularly, to a trimmer designed for trimming grinding wheels so as to produce a specific peripheral form on the wheel.

In grinding wheels, and especially wheels designed for use in grinding toothed spaces of a gear or gear-like member, the periphery of the wheel of course forms the root on the gear. In some cases the involute profiles of the gear teeth are connected by fillets which are strictly circular in cross-section. In other cases the roots of the involutes are interconnected by surfaces which are arcuate where the root surface blends with the involute surface in conjunction with a straight or flat surface tangent to the adjacent ends of the arcuate circular surfaces.

It is an object of the present invention to provide a trimmer for forming the periphery of grinding wheels in which means are provided for shaping the periphery of the trimmer with a surface which in cross-section comprises a pair of arcuate surfaces interconnected by a straight surface.

It is a further object of the present invention to provide a trimmer of the character described which includes means for adjusting and variably controlling the length of the straight line portion of the surface intermediate the circular arcs, even to the extent of eliminating the straight line surface so that the entire periphery of the wheel has a cross-sectional shape of a single circular arc.

It is a feature of the present invention to provide a trimmer including a slide having a shaft journaled thereon for supporting a trimming element, means for traversing the slide, means for rotating the shaft, adjustable means for limiting traverse of the slide and for preventing rotation of the shaft except when the slide is at one or the other extremity of its possible traverse.

Other objects and features of the invention will become apparent as the description proceeds, especially when taken in conjunction with the accompanying drawings, wherein:

Figure 1 is a side elevation of a trimmer with parts in section.

Figure 2 is a view of the trimmer looking generally in the direction of the arrows 2—2, Figure 1.

Figure 3 is a sectional view on the line 3—3, Figure 1.
Figure 4 is a sectional view on the line 4—4, Figure 1.
Figure 5 is a sectional view on the line 5—5, Figure 1.
Figure 6 is a sectional view on the line 6—6, Figure 3.
Figure 7 is a fragmentary perspective view illustrating the operation of the trimmer.
Figure 8 is a section on the line 8—8, Figure 2.

The trimmer comprises a post 10 adapted to be supported upon and extend vertically upwardly from the table of a grinder. The post 10 has a vertically extending recess 12 through which extends a threaded member 14, the member having associated therewith an adjusting nut 16 located in a transverse slot 18 extending through the post to expose the knurled surface of the nut 16 for effecting vertical adjustment of the member 14. The member 14 is held against rotation in the recess 12 and for this purpose the post 10 is provided with a boss 20 carrying a pair of screws 22 and 24. As best seen in Figure 1, the screws 22 and 24 are slightly offset laterally from each other and have rounded noses adapted to enter in a relatively wide vertically extending slot 26 in the member 14. The screws 22 and 24 may be adjusted to effect limited rotational adjustment of the member 14 and also to lock the member positively in the desired position of angular adjustment.

At the upper end of the member 14 there is a ledge 30 having an upwardly extending pivot stud 32 which is radial of the wheel and which carries a trimmer support arm 34. The trimmer support arm 34 includes a downwardly and laterally extending portion 36 which at its outer end has an upwardly extending portion 38 provided with a seat 40 on which is rigidly supported a trimmer base 42. The trimmer base 42 is formed to provide a horizontally extending way 44 on which is mounted a slide 46. The slide 46 includes an integral tubular extension 48 and sleeved within a bearing 50 in the slide is a shaft 52. Keyed to the outer end of the shaft 52 is a trimmer arm 54 having the usual adjustable trimming point or diamond 56 carried thereby. The base 42 is provided with an elongated slot 58 through which the shaft 52 extends to permit traverse of the slide and the shaft carried thereby along the ways 44.

Within the elongated slot 58 the shaft 52 has keyed or otherwise secured thereto a worm gear 60 which meshes with an actuating worm 62 carried by a shaft 63 connected to an external hand wheel 64 for actuation thereby.

The base 42 carries two adjustable plates 66 and 68. Each of the plates 66 and 68 is provided with a pair of elongated openings 70 through which clamping screws 72 extend. In addition, each of the plates 66 and 68 includes an enlarged elongated slot 74 which receives a circular adjusting element 76 formed eccentrically with respect to the shaft 78 of an adjusting element 80, the heads of the adjusting element including squared extensions 82 for engagement by an adjusting tool. Obviously, when the screws 72 are loosened adjusting elements 80 may be rotated to move the plates 66 and 68 toward and away from each other.

Extending outwardly from the base 42 are a pair of locating pins 84. The plates 66 and 68 may be adjusted into contact with the pins 84 which determines the innermost position of the plates. The plates are each provided with arcuate recessed seats 86 in which are mounted angularly adjustable abutment elements 88 which are adapted to be clamped in adjusted position by lock screws 90. In addition, the plates 66 and 68 are provided with outwardly extending lugs 92 and 94 respectively.

Keyed or otherwise secured to the shaft 52 is a guide member 96 which is retained in assembly thereon by lock nuts 97. The guide member 96 includes a generally semi-circular portion 98 provided with flat guide surfaces 100 and 102. The surfaces 100 and 102 are coplanar and occupy the plane passing through the axis of the shaft 52. The lugs 92 and 94 cooperate respectively with the guide surfaces 100 and 102 and when the plates 66 and 68 are separated, lug 92 engages the surface 100 during traverse of the slide in one direction to prevent rotation of the shaft 52, while lug 94 engages the surface 102 during traverse of the slide in the other direction to prevent rotation of the shaft 52. Member 96 also includes a smaller semi-cylindrical portion 103 having abutment surfaces engageable with the laterally or inwardly disposed surfaces 105 of lugs 92 or 94.

In order to permit rotation of the shaft 52 when the slide has reached one or the other limits of its preselected traverse, the semi-circular portion 98 is provided with an arcuate channel or way 104, this channel or way opening at its ends into the flat surfaces 100 and 102 and being shaped to receive the lugs 92 or 94.

The guide member 96, as best illustrated in Figure 4, is provided with an abutment pin 106 which is engageable with the end of one of the adjustable abutment elements 88 to limit rotation of the shaft 52. Conveniently, a sheet metal cover 107 is carried by the slide 46 and may be attached thereto by screws indicated at 108.

When the plates 66 and 68 are in their innermost position and in abutment with the pins 84, the lugs 92 and 94 are in alignment with the arcuate channel or way 104 formed in the guide member 96. This is a condition illustrated in Figure 3. At this time rotation of the hand wheel 64 applies a turning force to the worm 62 which is in engagement with the worm wheel 60 keyed or otherwise secured to the trimmer shaft 52. At this time traverse of the slide 46 is prevented by engagement between the inner surfaces of the lugs 92 and 94 and adjacent surfaces of the plates 66 and 68 with the guide member 96. Accordingly, rotation of the hand wheel 64 in either direction will result in rotational movement of the shaft 52, the amount of such rotation being determined by engagement by the pin 106 and one or another of the adjustable abutment elements 88. Accordingly, at this time the diamond point 56 will trim a true circular arc on the grinding wheel which in turn is thus adapted to grind an arcuate root fillet on a gear.

If however, it is desired to change the cross-sectional shape of the periphery of the grinding wheel, the screws 72 may be loosened, the adjusting members 80 appropriately rotated to separate the plates 66 and 68 from the centering pins 84 by a predetermined amount and thereafter, the screws 72 retightened to clamp the plates 66 and 68 in adjusted position. The parts at this time will assume the position illustrated in Figure 4 wherein the lug 92 is seen to overlie a portion of the surface 100 and the lug 94 is seen to overlie a portion of the surface 102. Thus, if the hand wheel is rotated with the parts in this intermediate position shown in Figure 4, in either direction, the shaft 52 is prevented from turning and the force of the worm on the worm wheel is therefore effective in the manner of a worm operating with a rack to traverse the slide 46 to one or the other limits of its traverse as determined by the location of the plates 66 and 68. Assume that in Figure 4 the slide is traversed to cause the shaft 52 to move to the right. Traverse motion of the slide will be arrested when the arcuate surfaces of the guide member 96 engages the inner surface of the lug 94. Movement of the slide and shaft to this position will bring the right hand end of the arcuate way 104 into registration with the lug 94. The left hand end of the arcuate way will have moved further out of registration with the lug 92. However, when the parts reach this limiting position, the shaft 52 will be permitted to rotate in a counterclockwise direction, as seen in Figure 4. With the parts in this rotated position, if rotation of the hand wheel is reversed, the shaft will first rotate in a clockwise direction until the surfaces 100 and 102 are again in alignment with the cooperating surfaces on the lugs 92 and 94. At this time the surface 100 will engage the flat underside of the lug 92 so that further rotation is prevented. Further rotation of the hand wheel will thereupon result in movement of the slide and shaft 52 to the left, as seen in Figure 4, until such motion is arrested by engagement between the member 96 and the inner surface of the lug 92. At this time the lug 94 will overlie the surface 102 so as to prevent counterclockwise rotation of the shaft 52, but the lug 92 will be in alignment with the arcuate way 104 so as to permit clockwise rotation of the shaft. Accordingly, as the hand wheel is moved back and forth from one limiting position, the shaft 52 will first rotate clockwise, then move in straight line traverse, and then move further clockwise and reverse its cycle, moving counterclockwise in rotation, moving in straight line traverse, and then moving further counterclockwise to its other limiting position.

It will be apparent that by variable separation of the plates 66 and 68, the amount of straight line traverse of the slide is accurately controlled. It will further be recalled that when the plates 66 and 68 are adjusted to their innermost position, all traverse is prevented while full arcuate movement of the shaft 52 is permitted.

There is thus provided a simple trimmer adapted to be readily adjusted so as to trim either a continuous circular arc or a pair of separated circular arcs connected by a straight line of selected length.

Attention is directed to the fact that due to the inclination of the portion 36 of the arm 34, the entire actuating mechanism for the diamond is located below a horizontal plane P passing through the diamond point 56, and tangent to the edge of the wheel W as best illustrated in Figure 1. Moreover, the trimmer arm 54 and the tubular extension 48 of the slide 46 are provided with lines 110 and 112 which are in alignment when the trimmer arm 54 is in lowermost position. Therefore, the arrangement permits the use of the present wheel trimmer to be used in conjunction with a second trimmer such for example as an involute trimmer, which requires traverse of the grinding wheel from working position past the trimmer illustrated herein to the involute trimmer. It will be appreciated that the arm 34 will in use be adjusted about a vertical axis to correspond to the setting of the wheel where the wheel is employed to grind helical gears, this adjustment taking place about the axis of the pivot stud 32. If the diamond 56 is in its lowermost position, it will be appreciated that the grinding wheel may be traversed past the trimmer without danger of damaging the trimmer.

The drawings and the foregoing specification constitute a description of the improved trimmer in such full, clear, concise and exact terms as to enable any person skilled in the art to practice the invention, the scope of which is indicated by the appended claims.

What I claim as my invention is:

1. A trimmer for grinding wheels comprising a base, a slide mounted on said base for rectilinear traverse, a rotary shaft carried by said slide, a trimming arm on said shaft, a worm gear on said shaft, a worm on said base in mesh with said worm gear, a pair of adjustable plates on said base spaced at opposite sides of said shaft in the direction of traverse of said slide, a guide element keyed to said shaft having a flat guide surface movable with said shaft into parallelism with the direction of traverse of said slide and having an arcuate way therein, lugs on said plates shaped to fit within said arcuate way and having flat surfaces slidably associated with the flat guide surface of said guide element, said plates being adjustable to position said lugs in simultaneous registration with the ends of said arcuate guide whereby rotation of said worm in either direction will rotate said shaft without traverse of said slide, and adjustable laterally away from said shaft, to positions in which said lugs engage the flat guide surfaces of said guide element, whereby rotation of said worm will result in traverse of said slide until one or the other of said lugs is aligned with an end of said arcuate guide way.

2. A trimmer as defined in claim 1 in which said guide element includes abutment surfaces engageable with adjacent surfaces of said plates when the adjacent one of said lugs is aligned with said arcuate guide way to prevent traverse of said slide when rotation of said shaft is permitted.

3. A trimmer as defined in claim 2 comprising a pair of locating pins carried by said slide at opposite sides of said shaft in position to be engaged by adjacent surfaces of said plates.

4. A trimmer as defined in claim 2 comprising an abutment on said guide element, and cooperating adjustable abutments on said plates to limit the amount of rotation of said shaft.

5. A trimmer as defined in claim 4 in which said adjustable abutments are mounted in arcuate slots in said plates which slots are concentric when said plates are in position to prevent rotation of said shaft.

6. A wheel trimmer comprising a movable slide mounted for rectilinear movement and having a rotary trimmer shaft carried thereby, a pair of abutments adjustable toward and away from the axis of said shaft and cooperable with means on said slide to selectively limit or prevent traverse of said slide, arcuate means on said abutments and on said shaft cooperable to prevent rotation of said shaft except when said slide is in a position determined by one or both of said adjustable abutments and adapted to interfit to permit rotation of said shaft when said slide is in said position.

7. A trimmer as defined in claim 6 in which said arcuate means includes a member carried by said shaft and having an arcuate way concentric of said shaft, and a pair of lugs on said abutments enterable into one end or the other of said arcuate way.

8. A trimmer as defined in claim 7 in which said lugs have flat guide surfaces, and said member has a flat guide surface engageable with the flat guide surfaces of said lugs, said arcuate way entering into the flat guide surface of said member.

9. A trimmer comprising a laterally movable trimmer shaft, a guide on said trimmer shaft, a pair of members spaced laterally at opposite sides of said shaft and adjustable radially of said shaft towards and away therefrom, said members constituting abutments effective to limit lateral movement of said shaft, arcuate slot and follower means on said members and said guide engageable when said shaft is in either limiting position of traverse to guide said shaft in rotation, other means on said members and guide effective to prevent rotation of said shaft in either direction when said shaft is in any intermediate position of its lateral movement, and operating means connected to said shaft for applying a simultaneous torque and lateral thrust thereto to effect consecutive rotation, traverse and rotation as permitted by said guide and said pair of members.

10. A trimmer comprising a base, rectilinear ways on said base, a slide movable in said ways, a shaft on said slide extending therefrom perpendicular to the plane of said ways, a trimmer arm on said shaft, adjustable abutments on said base movable toward and away from the axis of said shaft to limit rectilinear movement of said slide, a guide member fixed to said shaft, said guide member and abutments comprising a pair of arcuate guide and guide follower elements, one pair of elements being out of registration except when said slide and shaft are at one limit of rectilinear movement to prevent rotation of said arm about the axis of said shaft.

11. A trimmer as defined in claim 10 in which said arcuate guide elements comprise flat end surfaces at diametrically opposite sides of said shaft, and said followers are movable across said end surfaces into and out of registration therewith and prevent rotation of said shaft and arm except when one of said followers is in registration with the associated arcuate guide.

12. A trimmer as defined in claim 10 in which said arcuate guide elements comprise end portions of an arcuate groove in said guide member and said followers are lugs on said abutments.

13. Mechanism of the character described comprising a pivot pin adapted to occupy a position generally radial of a grinding wheel to be trimmed and having a free end adapted to extend toward the wheel, trimming mechanism comprising a diamond and a trimmer arm therefor, actuating means for said trimmer arm for moving said diamond in a path transversely across the edge of the wheel, said diamond being located in intermediate position beyond the free end of said pin in axial alignment therewith and located in a reference plane tangent to the periphery of the wheel and perpendicular to the axis of said pin, and support means for said trimmer arm and its actuating means comprising a support arm extending obliquely from said pin away from said reference plane, said actuating mechanism comprising a shaft connected to said trimmer arm and inclined from said reference plane in an amount such that said actuating mechanism, said shaft, and said trimmer arm all lie at the opposite side of said reference plane from said wheel.

14. Mechanism as described in claim 13, in which said support arm is angularly movable about the axis of said pin.

References Cited in the file of this patent

UNITED STATES PATENTS

| | | |
|---|---|---|
| 838,250 | Hudlow | Dec. 11, 1906 |
| 2,014,768 | Klingele | Sept. 17, 1935 |
| 2,217,545 | Guenther | Oct. 8, 1940 |
| 2,294,492 | Wilson | Sept. 1, 1942 |
| 2,404,465 | Statia | July 23, 1946 |
| 2,617,403 | Beauchemin | Nov. 11, 1952 |

FOREIGN PATENTS

| | | |
|---|---|---|
| 531,013 | Great Britain | Dec. 27, 1940 |
| 929,430 | France | July 15, 1947 |